United States Patent
Kim et al.

(10) Patent No.: US 9,774,278 B2
(45) Date of Patent: Sep. 26, 2017

(54) SYSTEM AND METHOD FOR ELECTRIC POWER GENERATION USING PIEZOELECTRIC MODULES

(71) Applicants: Namhyo Kim, Houston, TX (US); Alvaro Jose Arrazola, Houston, TX (US); James Benjamin Bloys, Katy, TX (US)

(72) Inventors: Namhyo Kim, Houston, TX (US); Alvaro Jose Arrazola, Houston, TX (US); James Benjamin Bloys, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 487 days.

(21) Appl. No.: 14/529,701

(22) Filed: Oct. 31, 2014

(65) Prior Publication Data
US 2016/0126867 A1 May 5, 2016

(51) Int. Cl.
*H01L 41/113* (2006.01)
*H02N 2/18* (2006.01)

(52) U.S. Cl.
CPC .................. *H02N 2/185* (2013.01)

(58) Field of Classification Search
CPC ............................ H02N 2/185; H01L 41/113
USPC .......................................................... 310/339
See application file for complete search history.

(56) References Cited

U.S. PATENT DOCUMENTS

| | | | | |
|---|---|---|---|---|
| 4,387,318 A | * | 6/1983 | Kolm | F03B 13/141 310/330 |
| 7,183,693 B2 | * | 2/2007 | Brantner | H02N 2/181 310/319 |
| 2008/0277941 A1 | * | 11/2008 | Bowles | E21B 41/0085 290/54 |
| 2010/0219646 A1 | * | 9/2010 | Hay | E21B 41/0085 290/1 A |
| 2012/0032560 A1 | * | 2/2012 | Ochoa | E21B 47/18 310/339 |
| 2012/0326536 A1 | * | 12/2012 | Nair | H01L 41/125 310/26 |
| 2013/0069487 A1 | * | 3/2013 | Houser | H02N 2/18 310/339 |
| 2013/0119669 A1 | * | 5/2013 | Murphree | H02N 2/185 290/54 |
| 2016/0126865 A1 | * | 5/2016 | Kim | H02N 2/185 310/339 |
| 2016/0126866 A1 | * | 5/2016 | Kim | H02N 2/185 310/339 |

(Continued)

*Primary Examiner* — Thomas Dougherty
(74) *Attorney, Agent, or Firm* — King & Spalding LLP

(57) ABSTRACT

A piezoelectric power generation system includes a housing and one or more piezoelectric modules disposed within the housing. Each of the one or more piezoelectric modules include a support structure, one or more piezoelectric components, and one or more exciters. The one or more piezoelectric components are disposed on or within the support structure, wherein at least a portion of vibrational motion in the support structure is transferred to the one or more piezoelectric components. The one or more exciters are coupled to the support structure and extend outside of the housing. When the exciters are actuated, they transfer vibrational motion to the one or more piezoelectric components through the support structure.

20 Claims, 3 Drawing Sheets

(56) References Cited

U.S. PATENT DOCUMENTS

2016/0164437 A1* 6/2016 Kim .................... H02N 2/185
310/339

* cited by examiner

SYSTEM AND METHOD FOR ELECTRIC POWER GENERATION USING PIEZOELECTRIC MODULES

RELATED APPLICATIONS

The present application is related to U.S. patent application Ser. No. 14/529,686, titled "SYSTEM AND METHOD FOR ELECTRIC POWER GENERATION USING STRUCTURED STACKED PIEZOELECTRIC ARRAYS," and filed concurrently herewith; and U.S. patent application Ser. No. 14/529,593, titled "SYSTEM AND METHOD FOR ELECTRIC POWER GENERATION USING STRUCTURED PIEZOELECTRIC ARRAYS,".

TECHNICAL FIELD

The present application relates to remote power generation. Specifically, the present application relates to fluid flow induced power generation using piezoelectric modules disposed in a housing which protects the stacked piezoelectric components from the flow stream.

BACKGROUND

In certain downhole operations, power is needed to run various components of a downhole assembly. For example, power is needed to drive actuators for valves and other components, and to power various sensors and communication devices. In many cases, power is generated downhole via a downhole power generation device that is coupled to the downhole assembly. Some of the devices may be designed to use mechanical power from the fluid flow to generate electric power downhole such as the mechanisms using flow induced vibration. For example, piezoelectric elements have been used in such devices to generate electric energy when actuated by the fluid flow. The current state of the art is to expose small and independent piezoelectric elements to the main flow stream, which causes the piezoelectric elements to vibrate and generate electricity. Typically, the flow stream induces a relatively high frequency of vibration, such as 1 kHz or higher. However, such flow streams are likely to carry particulates and debris. Thus, when the piezoelectric elements are directly exposed to the particle-laden flow stream, the piezoelectric elements are likely to experience increased fatigue and erosion caused by the particulates. Additionally, the high vibrational frequency induced by the flow stream further adds to the fatigue experienced by the piezoelectric elements These factors translate into a shortened operational life of the power generation system.

SUMMARY

In one aspect of the present disclosure, a piezoelectric power generation system includes a housing and one or more piezoelectric modules. The housing includes an outer profile and an inner profile. The inner profile defines an orifice through which a tubing can be disposed. The housing includes one or more module slots formed in the housing between the outer profile and the inner profile. The one or more piezoelectric modules are respectively disposed within the one or more module slots. Each of the one or more piezoelectric modules include a support structure, one or more piezoelectric components, and one or more exciters. The one or more piezoelectric components are disposed on or within the support structure, wherein at least a portion of vibrational motion in the support structure is transferred to the one or more piezoelectric components. The one or more exciters are coupled to the support structure and extend outside of the housing, wherein the exciters, when actuated, transfer vibrational motion to the one or more piezoelectric components through the support structure.

In another aspect of the present disclosure, a piezoelectric power generation system includes a housing and one or more piezoelectric modules disposed within the housing. Each of the one or more piezoelectric modules include a support structure, one or more piezoelectric components, and one or more exciters. The one or more piezoelectric components are disposed on or within the support structure, wherein at least a portion of vibrational motion in the support structure is transferred to the one or more piezoelectric components. The one or more exciters coupled to the support structure and extend outside of the housing, wherein the exciters, when actuated, transfer vibrational motion to the one or more piezoelectric components through the support structure.

In another aspect of the present disclosure, a piezoelectric power generation system includes a tubular housing and one or more piezoelectric modules. The tubular housing includes an outer surface and an inner surface, the inner surface defining an orifice through which a tubing can be disposed. The one or more piezoelectric modules are disposed within the housing between the inner surface and the outer surface. Each of the one or more piezoelectric modules include a support structure, one or more piezoelectric components, and one or more exciters. The one or more piezoelectric components are disposed on or within the support structure, wherein at least a portion of vibrational motion in the support structure is transferred to the one or more piezoelectric components. The one or more exciters are coupled to the support structure and extend outside of the housing. When the flow of fluid acts on the exciter, vibrational motion transfers to the one or more piezoelectric components through the support structure.

These and other aspects, objects, features, and embodiments will be apparent from the following description and the appended claims.

BRIEF DESCRIPTION OF THE DRAWINGS

The drawings illustrate only example embodiments of the present disclosure, and are therefore not to be considered limiting of its scope, as the disclosures herein may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements. In one or more embodiments, one or more of the features shown in each of the figures may be omitted, added, repeated, and/or substituted. Accordingly, embodiments of the present disclosure should not be limited to the specific arrangements of components shown in these figures.

DETAILED DESCRIPTION OF EXAMPLE EMBODIMENTS

Figure 1:
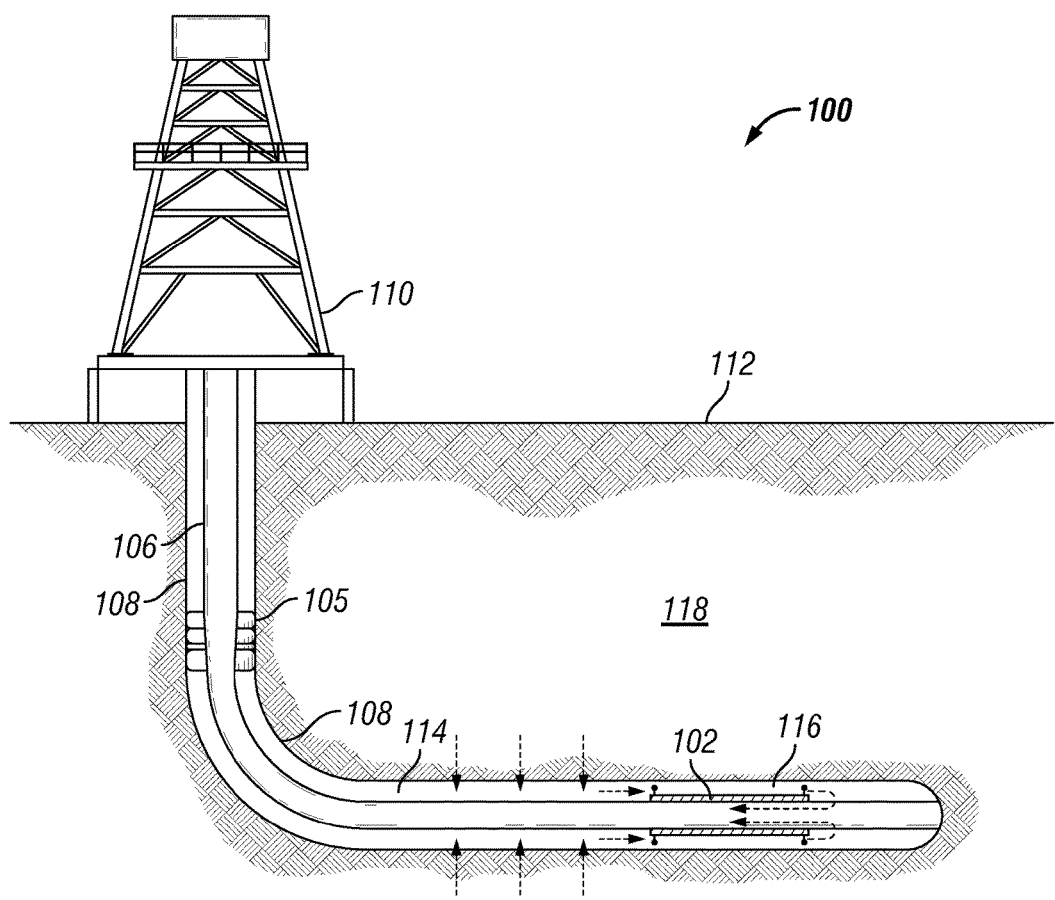
FIG. 1 illustrates a schematic diagram of a well site in which a piezoelectric power generation system has been deployed, in accordance with example embodiments of the present disclosure.

Example embodiments directed to a power generation system having a structured piezoelectric array will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments disclosed herein may be practiced without these specific details. In other instances, well-known features have not been described in detail to avoid unnecessarily complicating the description. The example embodiments illustrated herein include certain components that may be replaced by alternate or equivalent components in other example embodiments as will be apparent to one of ordinary skill in the art. Additionally, the present disclosure illustrates the system in the context of a down-hole application. However, in practice, the techniques and systems of the present disclosure can be used in a multitude of applications, including above-ground applications such as pipelines, as well as underwater operations, and other applications which provide a fluid flow and require remote power generation.

Referring now to the drawings, FIG. 1 illustrates a schematic diagram of a well site 100 in which a piezoelectric power generation system 102 has been deployed, in accordance with example embodiments of the present disclosure. In certain example embodiments, and as illustrated, the piezoelectric power generation system 102 (hereinafter "power generation system") is deployed in a wellbore 108. The wellbore 108 is formed in a subterranean formation 118 and coupled to a rig 110 on a surface 112 of the formation 118. The formation 118 can include one or more of a number of formation types, including but not limited to shale, limestone, sandstone, clay, sand, and salt. The surface 112 may be ground level for an on-shore application or the sea floor for an off-shore application. In certain embodiments, a subterranean formation 118 can also include one or more reservoirs in which one or more resources (e.g., oil, gas, water, steam) are located. In certain example embodiments, the wellbore 108 is cased with cemented metal pipe or other casing material, which is perforated to allow fluids to flow from the formation 118 into the wellbore 108. In certain example embodiments, the well 108 is a multi-zone well. A production tubing 106 is disposed downhole within the wellbore 108. Fluids are recovered and brought to the rig 110 through the production tubing. In certain example embodiments, a production packer 105 is coupled to the production tubing 106.

In certain example embodiments, the power generation system 102 is disposed in an annular space 114 around a portion of the production tubing 106. The annular space 114 is the space between the production tubing 106 and the wellbore 108. In the example embodiment of FIG. 1, the power generation system 102 is disposed directly around the production tubing, leaving an external annulus 116 between the power generation system 102 and the wellbore 108. Thus, in such example embodiments, production fluid flows past the power generation system 102 through the external annulus 116.

Figure 2:
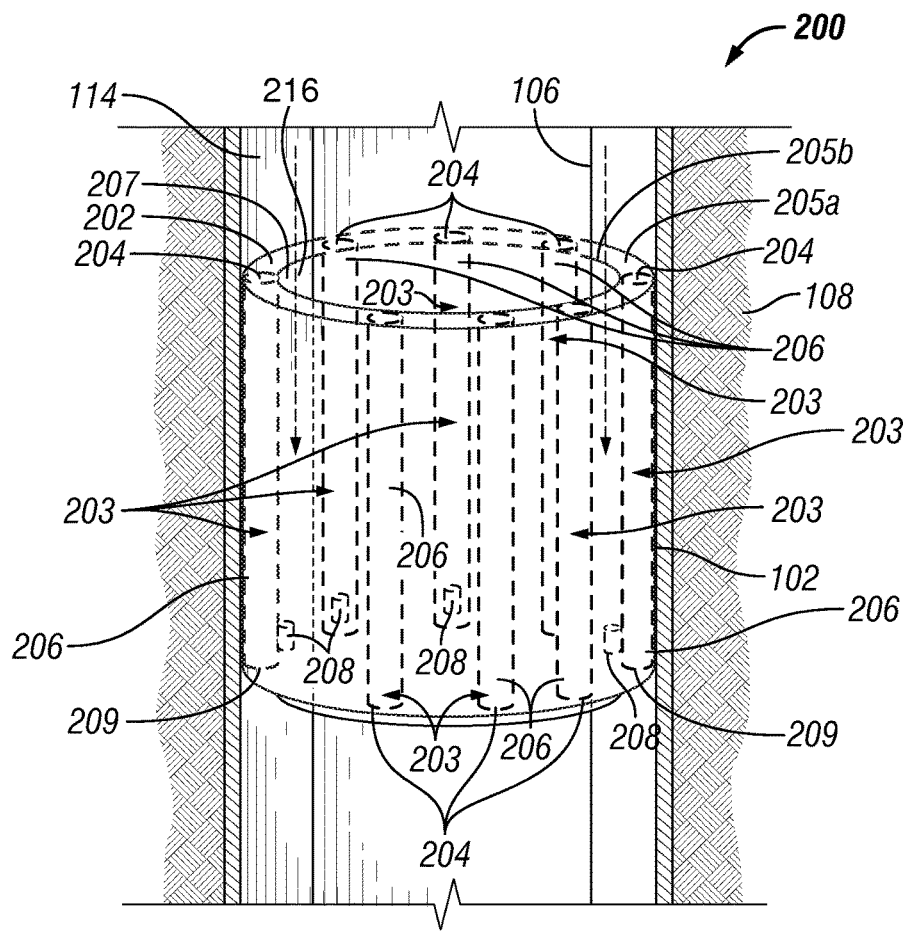
FIG. 2 illustrates a perspective diagram of a piezoelectric power generation system disposed around a production tubing, in accordance with example embodiments of the present disclosure.
Figure 3:
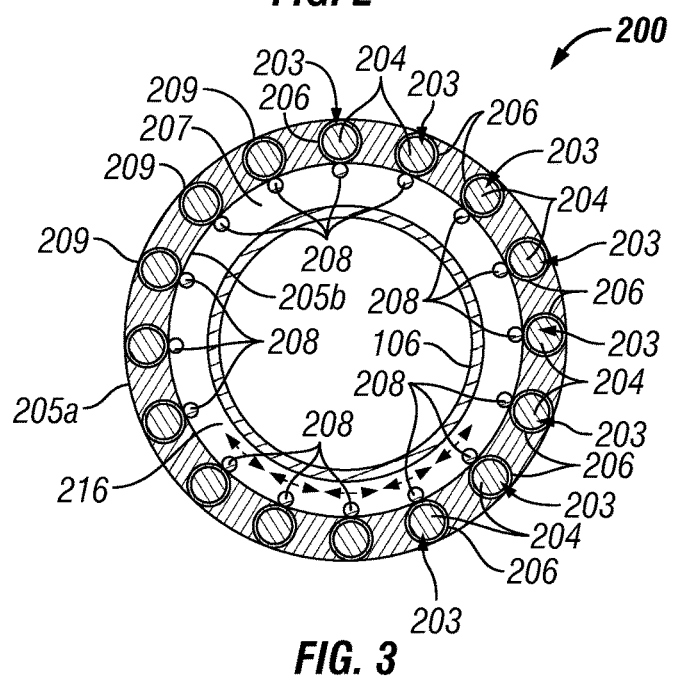
FIG. 3 illustrates a width-wise cross-sectional diagram of a piezoelectric power generation system disposed around a production tubing, in accordance with example embodiments of the present disclosure.

FIG. 2 illustrates a perspective diagram 200 of the power generation system 102 disposed around the production tubing 106, in accordance with example embodiments of the present disclosure. FIG. 3 illustrates a width-wise cross-sectional diagram of the power generation system 102 of FIG. 2, in accordance with example embodiments of the present disclosure. Referring to FIGS. 2 and 3, in certain example embodiments, the power generation system 102 includes a housing 202 and one or more piezoelectric modules 203. Each piezoelectric module 203 further includes a support structure 204, one or more piezoelectric components 206, and one or more exciters 208. In certain example embodiments, such as the embodiment illustrated in FIG. 2, the power generation system 102 is disposed adjacently against and within the wellbore 108, leaving an internal annulus 216 between the power generation system 102 and the production tubing 106. In such example embodiments, production fluid flows past the power generation system 102 through the internal annulus 216.

In certain example embodiments, the housing 202 includes an outer profile 205a and an inner profile 205b. The inner profile 205b defines an opening 207 through which the production tubing 106 is disposed. In certain example embodiments, the housing 202 includes one or more orifices 209 defined between the outer profile 205a and inner profile 205b of the housing 202. In certain example embodiments, the orifices 209 house the piezoelectric modules 203. Specifically, in certain example embodiments, each orifice 209 houses one piezoelectric module 203. The housing 202 protects the piezoelectric modules 203 from the harmful effects of being exposed to a direct flow of fluids on either side of the housing 202. The housing 202 keeping the piezoelectric modules 203 out of the way of the direct flow by acting as a barrier between the piezoelectric modules 203 and the direct flow. In certain example embodiments, the housing 202 has a tubular shape with a circular cross-section. The inner surface of the tubular shape corresponds with the inner profile 205b and the outer surface of the tubular shape corresponds with the outer profile. In certain example embodiments, the housing 202 has a square tubular shape with a square cross-section. In certain example embodiments, the cross-sectional profile of the housing 202 is one of a plurality of geometric, polygonal, or non-geometric shapes. In certain example embodiments, the housing 202 does not fully surround the production tubing 106. Rather, in such embodiments, the housing 202 is adjacent a portion of the production tubing 106.

In certain example embodiments, each piezoelectric module 203 includes a support structure 204, one or more piezoelectric components 206, and one or more exciters 208. The support structure 204 is disposed within the orifice 209 of the housing 202 and can be any shape or material that facilitates the transfer of vibrational motion or movement. In certain example embodiments, the support structure 204 has an overall tubular shape with a circular or oval cross-sectional profile. In certain other example embodiments, the support structure 204 has a square cross-sectional profile. In certain further example embodiments, the cross-sectional profile of the support structure 204 is one of a plurality of geometric, polygonal, or non-geometric shapes. For example, in one embodiment, the support structure 204 is a compression spring. In another example embodiment, the support structure 204 is a mesh tube or sheet. In certain example embodiments, the support structure 204 has a shape corresponding to the internal shape of the orifice 209 of the housing 202. In certain example embodiments, the support structure 202 is constructed of a metallic material. In certain example embodiments, the support structure 202 is designed to vibrate at a certain known resonant frequency. In certain example embodiments, the respective support structures 202 of each of the one or more piezoelectric modules 203 are configured to vibrate at the same resonant frequency. In certain example embodiments, the support structures 202 are configured to vibrate at distinct resonant frequencies.

The one or more piezoelectric components 206 are disposed on or within the support structure 204. Specifically, in a first group of example embodiment, the piezoelectric components 206 are mounted on the support structure 204. In certain such example embodiments, the piezoelectric components 206 are mounted on the outer profile 205a of the support structure 204. In other example embodiments, the piezoelectric components 206 are mounted on the inner profile 205b of the support structure 204. In certain example embodiments, the one or more piezoelectric components 206 are flexible piezoelectric film components. The piezoelectric components 206 are mounted on the support structure 204 such that vibrational motion and energy in the support structure 204 is translated to the piezoelectric components 206, actuating the piezoelectric elements to generate electric energy. In certain such example embodiments, the vibrations cause flexural vibration or motion in the piezoelectric components 206. In certain example embodiments, the piezoelectric elements generate electric energy through a flexural vibration mode, a longitudinal vibration mode, a torsional vibration mode, a shear vibration mode, or any combination thereof.

In certain example embodiments, the one or more piezoelectric modules 203 form an array or sheet of piezoelectric elements 206 disposed over and in contact with a surface formed by the outer profile 205a of the housing 202. In certain example embodiments, piezoelectric modules 203 cover the entire surface of the outer profile 205a. In certain other example embodiments, the piezoelectric components 206 cover a portion of the surface of the outer profile 205b. In certain example embodiments, the vibrational frequency of the one or more piezoelectric components 206 corresponds to the resonant frequency of the respective support structure 204. In such embodiments, the one or more piezoelectric components 206 vibrate in unison and generate electricity in phase. Thus, the phase and frequency of electric power generated through the piezoelectric components 206 is predictable and controllable through the design of the support structure 204.

In a second group of example embodiments, the piezoelectric modules 203 comprise piezoelectric components 206 disposed between two portions of the support structure 204 such that the piezoelectric components 206 can experience compression forces by the two portions of the support structure 204. In certain such example embodiments, the piezoelectric components 206 include a stacked piezoelectric component. In certain such example embodiments, the support structure 204 is coil shaped, or includes several portions with one or more of the piezoelectric components 206 disposed therebetween. In certain example embodiments, two separate portions of the support structure 204 are coupled to each other such that compressive motion is allowed between the two separate portions. In certain example embodiments, two separate portions of the support structure 204 are coupled via a row or layer of piezoelectric components 206 disposed between the two separate portions. Thus, compressive motion between the two separate portions compresses the piezoelectric components 206. The piezoelectric components 206, when compressed, generate electric energy.

In certain example embodiments, the support structure 204 is tubular, and comprises multiple tubular segments separated by stacked piezoelectric components 206. In certain example embodiments, the piezoelectric modules 203 include one or more layers of piezoelectric components 206 disposed between various portions of the support structure 204. In certain example embodiments, the piezoelectric modules 203 includes alternating layers of portions of support structure 204 and layers of piezoelectric components 206. In certain example embodiments, one or more portions of the support structure 204 comprise a compression spring. In certain other example embodiments, one or more portions of the support structure 204 are rigid, translating substantially all compression to the stacked piezoelectric components 206. In certain example embodiments, the support structure 204 is configured to exhibit longitudinal motion, vibration, or longitudinal waves. In certain example embodiments, such movement causes the piezoelectric components 206 to compress, generating electric energy.

In certain example embodiments, the one or more piezoelectric components 206 are each made up of many layers of piezoelectric material, which generate electric energy when stressed or compressed. In certain example embodiments, the one or more stacked piezoelectric components 206 are replaced by a single sheet of piezoelectric material. In certain example embodiments, movement of the support structure 204 causes longitudinal vibrations in the piezoelectric components 206, which causes the stacked piezoelectric components 206 to generate electric energy in a longitudinal vibration mode.

In certain example embodiments, the one or more exciters 208 are coupled to the support structure 204 and extend through and out of the housing 202, such that the exciters 208 stick out of the housing 202 and into the external annulus 116 between the power generation system 102 and the wellbore 108. Such an example embodiment is illustrated in FIG. 1. In certain other example embodiments, the one or more exciters extend out of the housing 202 and into the internal annulus 216, as shown in FIGS. 2 and 3. In certain example embodiments, small apertures such as slots are formed in the housing 202, coupling the orifices 209 to an environment outside of the housing 202. The apertures are sized to allow the exciters 208 to have a certain range of motion within the apertures. In certain example embodiments, the apertures allow for a nominal amount of fluid exchange between the inside of the housing 202 and the outside of the housing 202. In certain example embodiments, when in use, the exciters 208 are exposed to the direct flow of fluid in the external annulus 116 or the internal annulus 216. The flow of fluid against the exciters causes the exciters 208 to move or vibrate. As the exciters are coupled to the support structure 204, the vibrational movement or energy is transferred to the support structure 204, causing the support structure 204 to move or vibrate. In certain example embodiments, the exciters 208 include a stem portion and an end portion, in which the end portion has a relatively larger surface area to be acted on by the flow of fluid. The stem portion is relatively thin and flexes to allow the end portion to move up and down.

In certain example embodiments, the fluid flows in a direction normal to the exciters, causing the exciters to move up and down. Additionally, in certain example embodiments, the fluid flows in a direction normal to the piezoelectric components 206 and in the same direction as the compressive direction of the piezoelectric components 206. The movement of the exciters 208 caused by the traversing fluid flow causes the support structure 204 to move back and forth along the same axis of motion. This causes the piezoelectric components 206 disposed between the portions of the support structure 204 to be compressed, generating electric energy. The support structure 204 then translates the vibrational movement or energy to the piezoelectric components 206, and electric power is generated. The exciters 208 can be arranged in various configurations, such as in a ring as illustrated in FIG. 3, in a row, and the like. The number and position of the exciters 208 can be selected based on certain factors such as the fluid flow rate, and vibrational frequency, and desired frequency of electric power generation, and the like. In certain example embodiments, a piece of material may be placed between the stem and the support structure 204. In certain such embodiments, the piece of material is configured to augment the vibrational frequency of the exciters 208 such that the vibrational motion and energy received by the support structure 204 has more desirable parameters. For example, the piece of material may have a dampening or exaggerating effect. The one or more exciters are designed and fabricated to be robust against erosion and other degenerative effects of fluid flow.

In certain example embodiments, the number of piezoelectric modules 203 included in the power generation device 102 is selected based on a number of conditions and desired results, including rate of fluid flow, size of the annular space 114, desired amount of power generated and/or needed, and the like. Likewise, the number and configuration of piezoelectric components 206 within each piezoelectric module 203 is determined based on a similar criteria. In one or more example embodiments, the piezoelectric modules 203 have a different configuration and layout than that illustrated in FIG. 2. For example, the piezoelectric module 203 can be arranged in an orientation perpendicular to the direction of the housing 202 or tubing 106 rather than parallel with as illustrated, or at any angle in between. In certain example embodiments, the piezoelectric modules 203 are stacked within the housing 202. In certain example embodiments, the piezoelectric modules 203 are not linear or tubular as illustrated, but are configured as other geometric or non-geometric shapes, such as a ball shape, a prism shape. In certain example embodiments, the piezoelectric modules 203 have a thin, sheet-like shape. The one or more piezoelectric modules 203 can have the same or different configurations.

In certain example embodiments, the power generation system 102 further includes electric circuitry and a power storage device (not shown), such as a battery, a capacitor, and the like. The power storage device is coupled to the one or more piezoelectric components 206 such that electric energy generated by the piezoelectric components 206 is stored in the power storage device. In certain example embodiments, the power storage device is coupled to the piezoelectric components 206 via one or more processing components which process the electric energy generated by the piezoelectric components into a storable form. In certain example embodiments, the power storage device is disposed within the housing 202. In certain example embodiments, the power storage device is distinctly coupled to individual or groups of piezoelectric components 206 such that if certain piezoelectric components 206 fail, the remaining are still able to generate and send power to the power storage device.

Figure 4:
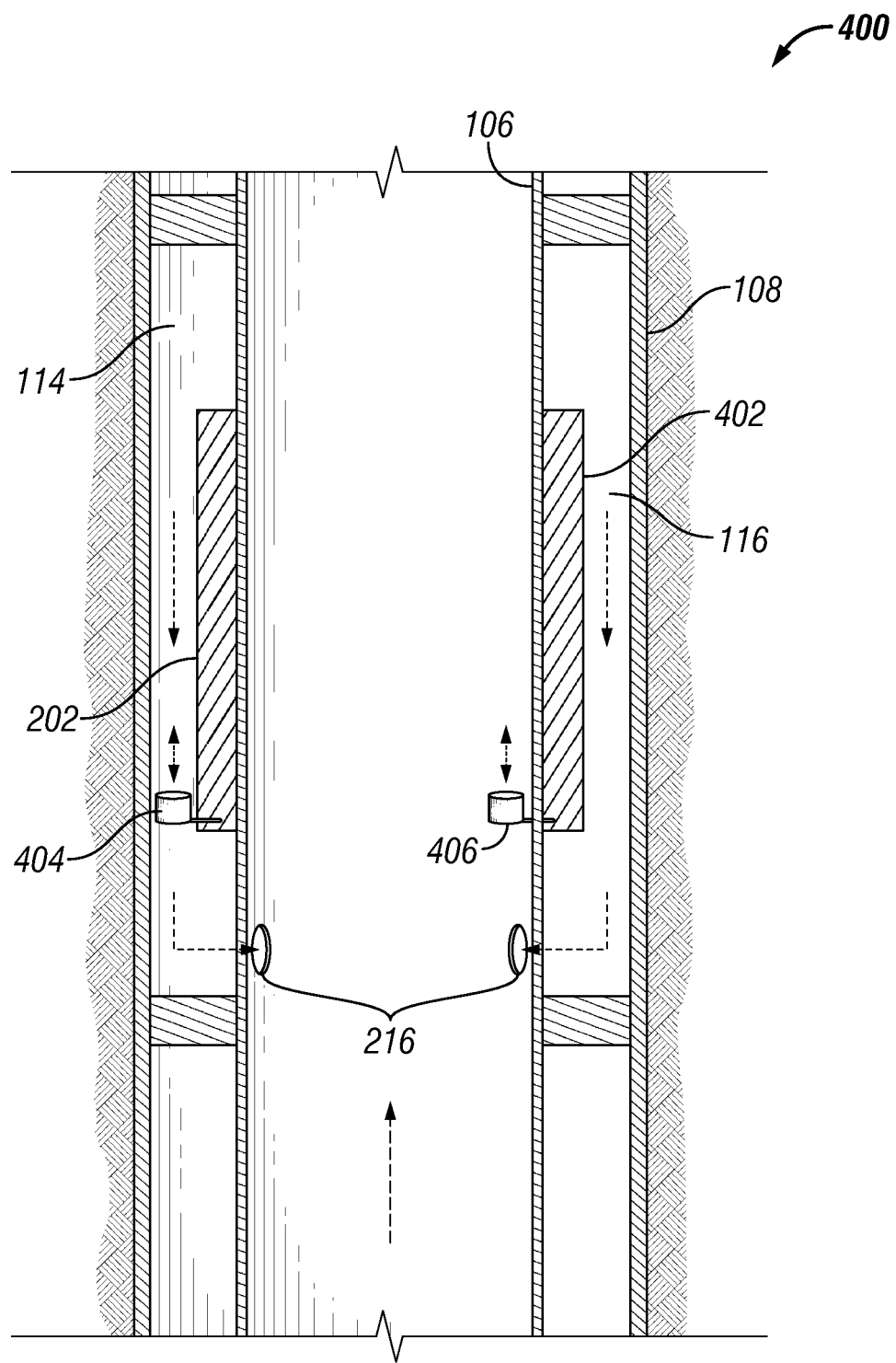
FIG. 4 illustrates a length-wise cross-sectional diagram of a piezoelectric generation system having an outwardly extending exciter and an inwardly extending exciter, in accordance with example embodiments of the present disclosure.

FIG. 4 illustrates a length-wise cross-sectional diagram 400 of a piezoelectric generation system 402 having an outwardly extending exciter 404 and an inwardly extending exciter 406, in accordance with example embodiments of the present disclosure. In certain example embodiments, the outwardly extending exciter 404 extends outwardly from the housing 202, where it is exposed to the flow of fluids in the external annulus 116. In certain example embodiments, the inwardly extending exciter 406 extends inwardly from the housing and into the production tubing 106, wherein it is exposed to the flow of fluids in the production tubing 106. In such example embodiments, the flow of fluid inside the production tubing 106 flows past and actuates the exciters 406. In certain example embodiments, the inwardly extending exciter 406 extends inwardly from the housing 202 but remains in the internal annulus 216 and does not traverse the production tubing 106, as illustrated in FIGS. 2 and 3. In certain example embodiments, the piezoelectric generation systems 102, 402 can have all outwardly extending exciters 404, all inwardly extending exciters 406, or a combination of both.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A piezoelectric power generation system, comprising:
    a housing comprising an outer surface and an inner surface, the inner surface defining an orifice through which a tubing can be disposed, wherein the housing comprises one or more module slots formed in a wall of the housing between the outer surface and the inner surface; and
    one or more piezoelectric modules respectively disposed within the one or more module slots, each of the one or more piezoelectric modules comprising:
        a support structure;
        one or more piezoelectric components disposed on or within the support structure; and
        one or more exciters coupled to the support structure and extending through the housing to outside of the housing, wherein the one or more exciters, when actuated, transfer vibrational motion to the one or more piezoelectric components through the support structure.

2. The piezoelectric power generation system of claim 1, wherein the one or more piezoelectric components are disposed on the support structure, wherein vibrational motion in the support structure causes flexural vibration in the one or more piezoelectric components.

3. The piezoelectric power generation system of claim 1, wherein the one or more piezoelectric components are disposed between one or more portions of the support structure, wherein vibrational motion in the support structure causes compressional vibration in the one or more piezoelectric components.

4. The piezoelectric power generation system of claim 3, wherein the one or more piezoelectric components include one or more stacked piezoelectric components.

5. The piezoelectric power generation system of claim 1, wherein the one or more exciters extend from the support structure past the inner surface of the housing.

6. The piezoelectric power generation system of claim 1, wherein the one or more exciters extend from the support structure past the outer surface of the housing.

7. The piezoelectric power generation system of claim 1, wherein the housing substantially shields the one or more piezoelectric modules from an environment exterior to the housing.

8. A piezoelectric power generation system, comprising:
a housing; and
one or more piezoelectric modules disposed within the housing, each of the one or more piezoelectric modules comprising:
a support structure;
one or more piezoelectric components disposed on or within the support structure; and
one or more exciters coupled to the support structure and extending through the housing, wherein the one or more exciters extend inwardly or outwardly from the housing, wherein the one or more exciters, when actuated, transfer vibrational motion to the one or more piezoelectric components through the support structure.

9. The piezoelectric power generation system of claim 8, further comprising an electric circuit and a power storage device coupled to the one or more piezoelectric modules, the electric circuit and power storage device configured to process and store electric energy generated by the one or more piezoelectric modules.

10. The piezoelectric power generation system of claim 8, wherein the one or more piezoelectric components are configured in an array of piezoelectric components on the support structure.

11. The piezoelectric power generation system of claim 8, wherein the support structures of each or a subset of the one or more piezoelectric modules are configured to vibrate at the same resonant frequency.

12. The piezoelectric power generation system of claim 8, wherein the support structures of each or a subset of the one or more piezoelectric modules are configured to vibrate at different resonant frequencies.

13. The piezoelectric power generation system of claim 8, wherein one or a subset of the one or more piezoelectric modules are active and generate electric energy and the remaining piezoelectric modules are not active and do not generate electric energy.

14. The piezoelectric power generation system of claim 8, wherein the one or more piezoelectric components are disposed on a surface of the support structure, wherein vibrational motion in the support structure causes flexural vibration in the one or more piezoelectric components.

15. The piezoelectric power generation system of claim 8, wherein the one or more piezoelectric components are disposed between one or more portions of the support structure, wherein vibrational motion in the support structure causes compressional vibration in the one or more piezoelectric components.

16. A piezoelectric power generation system, comprising:
a tubular housing having an outer surface and an inner surface, the inner surface defining an orifice through which a tubing can be disposed; and
one or more piezoelectric modules disposed within one or more slots formed in a wall of the housing between the inner surface and the outer surface, each of the one or more piezoelectric modules comprising:
a support structure;
one or more piezoelectric components disposed on or within the support structure; and
one or more exciters coupled to the support structure and extending through the housing to outside of the housing, wherein the one or more exciters, when acted upon by a flow of fluid, transfer vibrational motion to the one or more piezoelectric components through the support structure.

17. The piezoelectric power generation system of claim 16, wherein the housing isolates the support structure and the one or more piezoelectric components of the one or more piezoelectric modules from the flow of fluid outside of the housing.

18. The piezoelectric power generation system of claim 16, wherein the support structure is a spring or a mesh material.

19. The piezoelectric power generation system of claim 16, wherein the piezoelectric elements generate electric energy through flexural vibration or compressional vibration when the support structure moves or vibrates.

20. The piezoelectric power generation system of claim 16, wherein the support structure is configured to vibrate at a known resonant frequency, and the one or more piezoelectric elements generate electric energy at a corresponding frequency.

* * * * *